US007427990B2

(12) United States Patent
Sadowski

(10) Patent No.: US 7,427,990 B2
(45) Date of Patent: Sep. 23, 2008

(54) DATA REPLACEMENT METHOD AND CIRCUIT FOR MOTION PREDICTION CACHE

(75) Inventor: Greg Sadowski, Cambridge, MA (US)

(73) Assignee: ATI Technologies, Inc., Markham, Ontario (CA)

( * ) Notice: Subject to any disclaimer, the term of this patent is extended or adjusted under 35 U.S.C. 154(b) by 419 days.

(21) Appl. No.: 11/342,985

(22) Filed: Jan. 30, 2006

(65) Prior Publication Data

US 2007/0176939 A1 Aug. 2, 2007

(51) Int. Cl.

| | |
|---|---|
| ***G06K 9/36*** | (2006.01) |
| ***G09G 5/36*** | (2006.01) |
| ***G06T 15/70*** | (2006.01) |
| ***G06T 7/20*** | (2006.01) |
| ***G06T 1/20*** | (2006.01) |
| ***H04N 7/26*** | (2006.01) |
| ***H04N 7/50*** | (2006.01) |

(52) U.S. Cl. ........................ 345/557; 345/606; 345/555; 345/556; 345/475; 382/232; 382/233; 382/238; 711/113; 711/118; 711/125; 348/394.1; 375/240.25

(58) Field of Classification Search ................. 345/428, 345/606, 618, 555–557, 475; 382/232–236, 382/238, 254, 276, 305; 711/113–118, 125–126, 711/3, 130; 375/240.12, 240.25; 348/394.1, 348/407.1; 341/50

See application file for complete search history.

(56) References Cited

U.S. PATENT DOCUMENTS

2003/0222877 A1 * 12/2003 Tanaka et al. ............... 345/503
2006/0050976 A1 * 3/2006 Molloy ....................... 382/233
2007/0008323 A1 * 1/2007 Zhou .......................... 345/475

* cited by examiner

*Primary Examiner*—Wesner Sajous
(74) *Attorney, Agent, or Firm*—Guerin & Rodriguez, LLP; William G. Guerin

(57) ABSTRACT

A system for decoding a video bitstream and a method for replacing image data in a motion prediction cache are described. For each of the cache lines, a tag distance between pixels stored in the cache line and uncached pixels that are to be stored in the cache is calculated. The calculated tag distance is used to determine whether the pixels are outside a local image area defined about the uncached pixels. Pixels determined to be outside the local image area are replaced with the uncached pixels. The motion prediction cache can be organized as sets of cache lines and the method can be performed for each of the cache lines in one of the sets. The definition of the sets can be changed in response to cache performance. Similarly, the local image area can be redefined in response to cache performance.

19 Claims, 6 Drawing Sheets

42

| ADDRESS | V | P | R | TIME | DIST |
|---|---|---|---|---|---|

| | | |
|---|---|---|
| C-4P-1 | C-4P | C-4P+1 |
| C-3P-1 | C-3P | C-3P+1 |
| C-2P-1 | C-2P | C-2P+1 |
| C-P-1 | C-P | C-P+1 |
| C-1 | C | C+1 |
| C+P-1 | C+P | C+P+1 |
| C+2P-1 | C+2P | C+2P+1 |
| C+3P-1 | C+3P | C+3P+1 |
| C+4P-1 | C+4P | C+4P+1 |

DATA REPLACEMENT METHOD AND CIRCUIT FOR MOTION PREDICTION CACHE

FIELD OF THE INVENTION

The present invention relates generally to video data caches and more particularly to an adaptive method for cache line replacement in motion prediction caches.

BACKGROUND OF THE INVENTION

Contemporary video compression algorithms require significant memory bandwidth for referencing previously decoded pictures. A decoder memory buffer is used to maintain a number of previously decoded image frames ready for display so these frames can be used as references in decoding other image frames. Due to the development and availability of high definition video, the rate at which the data in the decoder memory buffers are transferred has increased. In addition, the memory buffer typically provides data blocks that are substantially larger than that required by the decoder to process a particular image block, thereby increasing the memory bandwidth without benefit.

In some decoder systems motion prediction (MP) caches are used to limit the data transfer rate from the memory buffer. An MP cache stores image pixel values for previously decoded macroblocks that may be useful for subsequent macroblocks to be decoded. An MP cache is typically limited in capacity and expensive in comparison to a decoder memory buffer. An MP cache typically includes only a small portion of the pixel data necessary for a single video frame. Consequently, data in an MP cache are quickly replaced as new macroblocks or parts of macroblocks are written to the cache. The data replacement can be random or a least recently used (LRU) algorithm can be employed. The MP cache may be directly mapped based on one or more of memory address, image coordinates and other parameters. Cache thrashing occurs when two or more data items that are frequently needed both map to the same cache address. Each time one of the items is written to the cache, the other needed item is overwritten, causing cache misses during subsequent processing and limiting data reuse.

What is needed is a method for significantly reducing the data transfer rate from the decoder transfer buffer. The present invention satisfies this need and provides additional advantages.

SUMMARY OF THE INVENTION

In one aspect, the invention features a method for replacing image data in a motion prediction cache comprised of a plurality of cache lines. For each of the cache lines, a tag distance between pixels stored in the cache line and uncached pixels that are to be stored in the motion prediction cache is calculated. The calculated tag distance is used to determine whether the pixels stored in the cache line are outside a local image area defined about the uncached pixels. If the pixels in the cache line are determined to be outside the local image area, the pixels are replaced with the uncached pixels. In one embodiment, the motion prediction cache includes a plurality of sets of cache lines and the method is performed for each of the cache lines in one of the sets. In a further embodiment, the definition of the sets is changed in response to monitoring of cache performance. In another embodiment, the local image area is redefined in response to monitoring of cache performance.

In another aspect, the invention features a method for replacing image data in a motion prediction cache comprised of a plurality of cache lines. For each cache line, a tag distance between pixels stored in the cache line and uncached pixels that are to be stored in the motion prediction cache is calculated. The tag distances are compared to each other to determine a maximum tag distance. The pixels in one of the cache lines having the maximum tag distance are replaced with the uncached pixels.

In yet another aspect, the invention features a system for decoding a video bitstream. The system includes a motion prediction cache, a control module and a state machine. The motion prediction cache has a data memory for storing a plurality of cache lines and has a tag memory for storing a plurality of tag entries. Each tag entry includes at least one attribute of a respective one of the cache lines. The tag memory is organized as a plurality of sets defined according to the at least one attribute. The control module is in communication with the motion prediction cache. The control module is adapted to receive a request for a cache line. The request indicates at least one attribute of the cache line. The control module searches one of the sets according to the one or more attributes in the request to determine whether a tag entry for the requested cache line is in the tag memory. The control module determines a tag distance for each of the tag entries in the set if the tag entry is not in the tag memory. The state machine is in communication with the motion prediction cache. The state machine is configured to identify one of the cache lines in the data memory for replacement by the requested cache line if the tag entry for the requested cache line is not in the tag memory.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In brief overview, the present invention relates to a method for replacing image data in a motion prediction (MP) cache. A tag distance between each cache line stored in a set in the cache and a cache line to be stored in the same set of the cache is determined. Tag distances for the cache lines in the set are compared to one or more predetermined values or to each other to determine a cache line to be replaced. Advantageously, the method provides for a more efficient use of MP cache and a reduction in the decoder system bandwidth in comparison to conventional video decoding techniques. The tag distance can be defined using various parameters related to distance in an image frame. The tag distance can be dynamically redefined during the decoding of a video bitstream to improve utilization of the MP cache.

Motion prediction is commonly used in the encoding of video images. According to conventional encoding techniques employing motion prediction, successive images are compared and the motion of an area in one image relative to another image is determined to generate motion vectors. The areas are commonly referred to as macroblocks (e.g., 16×16 groups of pixels) although in some implementations the areas can be a portion of a macroblock (e.g., 8×8 pixel submacroblocks). Different picture formats utilize different numbers of pixels and macroblocks. For example, a 1920×1088 HDTV pixel format includes 120×68 macroblocks. To decode a video bitstream, a decoder shifts blocks in a previous picture according to the respective motion vectors to generate the next image. This process is based on the use of intracoded (I) frames, forward predicted (P) frames and bi-directional coded (B) frames as is known in the art.

Figure 1:
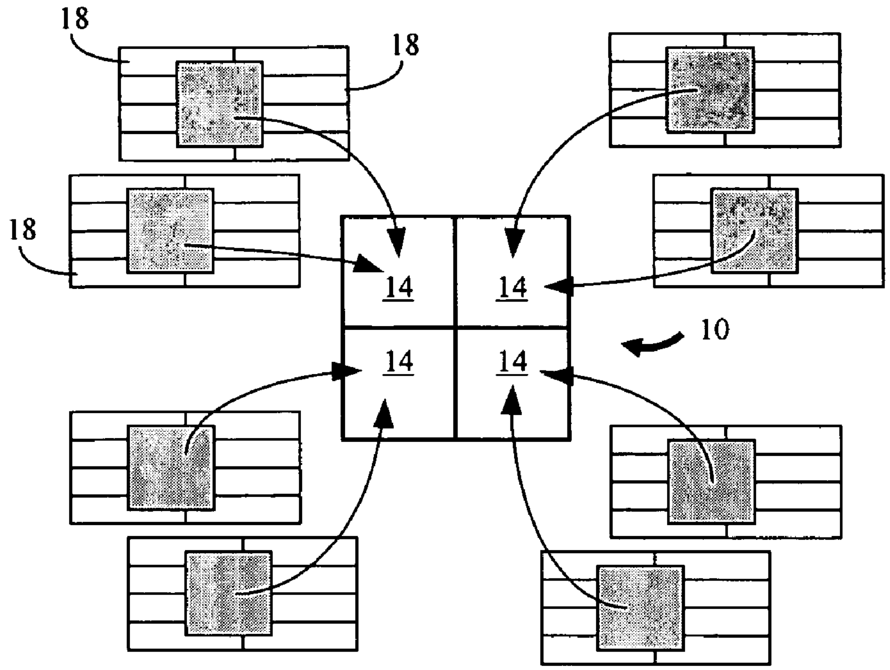
FIG. 1 illustrates the cache capacity required for a macroblock for a B frame with 16×4 tiling.

An MP cache enables the use of reference image pixel data (i.e., data which are stored in reference macroblocks) to build other macroblocks. Preferably, the size of the MP cache is sufficient for storage of one reference macroblock of prediction pixels. Thus the cache can rapidly accommodate all data requests for a current reference macroblock. For example, FIG. 1 depicts a 16×16 pixel macroblock 10 for a B frame. The macroblock 10 is divided into four submacroblocks 14 each having an 8×8 group of pixels. In a worst case scenario, each submacroblock 14 utilizes data from two different reference image frames. The MP cache comprises 64 tiles 18 of data effectively organized as two 8×4 tile sets where the factor of two is included to account for the possibility of using two reference image frames for each submacroblock 14 in the worst case illustration. Each tile corresponds to a 64 byte cache line or "cache block" that comprises pixel data from a 2×4 array of pixels. Thus the MP cache holds a total of 4 Kbytes of pixel data (2×8×4 tiles ×64 bytes per tile). The description for FIG. 1 is intended as an example only and it should be recognized that the size of an MP cache can be determined by other criteria including various modes of operation and different tile configurations.

Reference macroblocks can be in different reference frames but can also be in similar locations in the frames. Cache thrashing can occur if all the reference macroblocks are included in the cache. For example, when decoding a B frame, pixel data from similar locations in two different frames may be requested. The present invention utilizes a cache organization wherein the MP cache is divided into a number of submemories, or address "sets", within the cache. A set as used herein means cache lines that have a defined relationship. In one example, sets are defined such that each set corresponds to a particular reference frame. Thus all the cache lines in a set are from a single reference frame. In this example, the probability of cache thrashing due to reference macroblocks in different reference frames is significantly reduced. More specifically, pixel data for an image location in one reference frame is written to one set in the cache, previously stored data corresponding to the same image location but a different reference frame is stored in a different set and therefore is not evicted from the cache.

Figure 2:
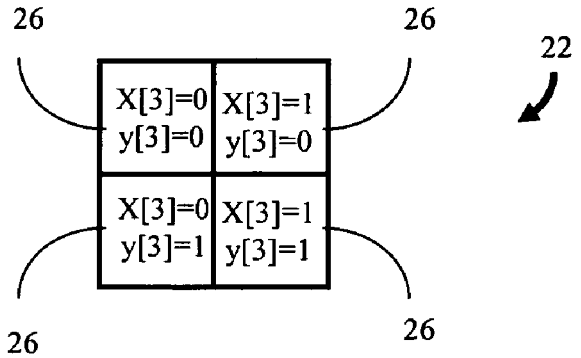
FIG. 2 illustrates how four 8×8 pixel submacroblocks of a macroblock can be identified to enable individual association with different sets in a cache.

Cache lines can be stored in the MP cache according to sets defined in a variety of ways. For example, sets can be defined according to reference frame numbers, x and y coordinates of submacroblocks, memory addresses of the requests, or combinations of two or more of these parameters. FIG. 2 illustrates a 16×16 pixel macroblock 22 having four 8×8 pixel submacroblocks 26. Each submacroblock 26 includes pixels in the macroblock 22 that have a common value for bit 3 of the x coordinate and bit 3 of the y coordinate of the pixel location in the image. This enables the submacroblocks 26 to be associated with different sets in the cache.

In some decoding instances it may be preferable to search for reference macroblocks or submacroblocks in the current area of interest in immediately preceding or following frames and, therefore, it would not be practical to define sets in cache according to reference frame number. In other instances the encoding process may utilize a large number of reference frames and, therefore, more complex criteria may be used to define the sets, including use of reference frame numbers. In these latter instances if the reference frame number were not utilized, data in a given spatial area might be replaced with data from a different reference frame that is in the same spatial area of an image.

Multiple programmable definitions of set addresses can be maintained, and the particular set definitions utilized can be dynamically selected based on recent cache performance in an attempt to achieve the best cache performance during the decoding process. Counters can be utilized to determine cache efficiency and whether to switch to a different set organization for the cache. Adaptive selection of set definitions is possible by examining the counters on a frame by frame basis or over longer intervals to determine whether to switch to a different set definition. For example, when decoding a particular movie the preferred set definitions are determined over time. If the general characteristics of the frames change at some time during the movie, the set definitions can be changed accordingly. As time progresses, the adaptation period can increase as knowledge about the frame characteristics increases.

Figure 3:
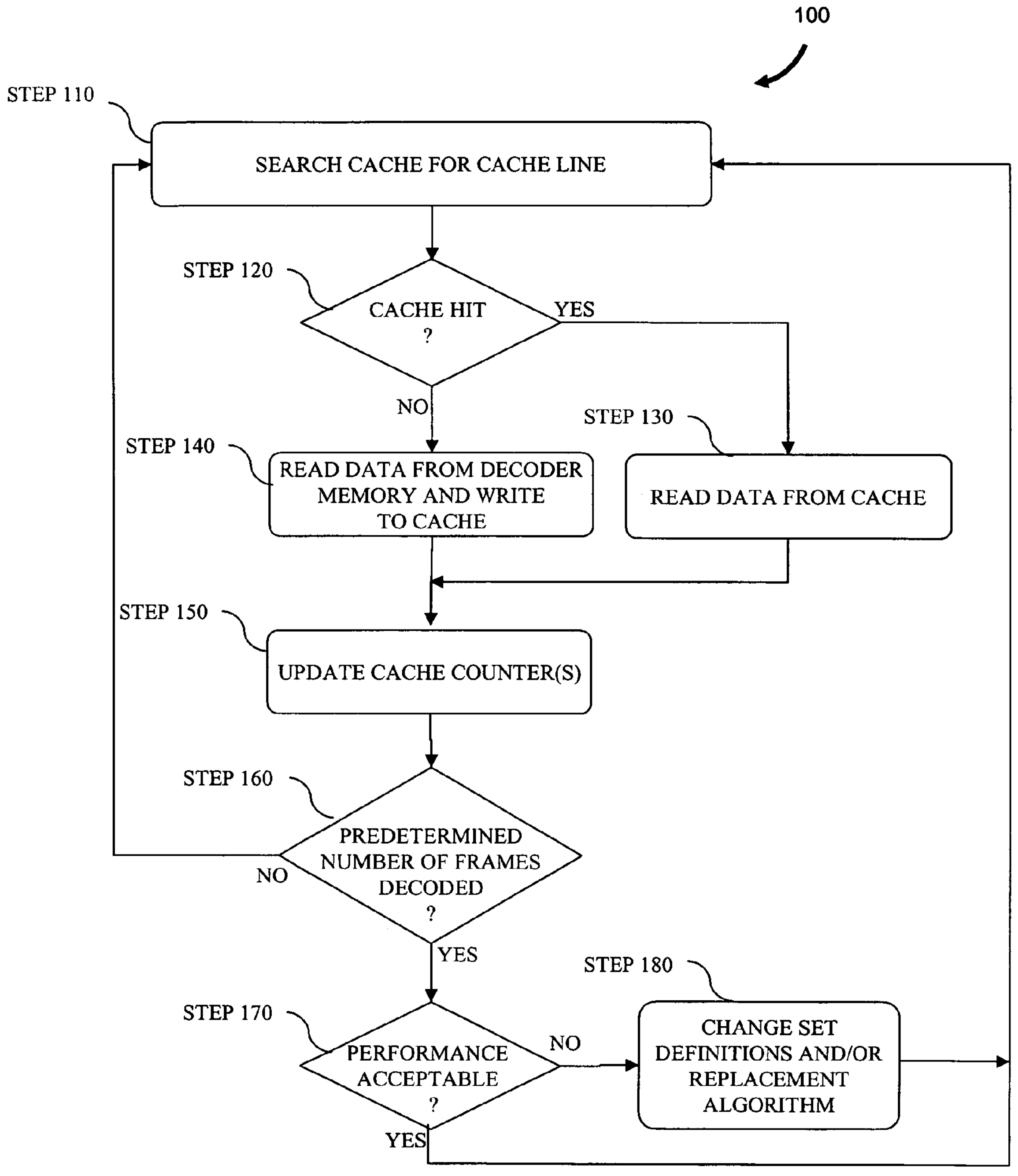
FIG. 3 is a flowchart representation of an embodiment of a method for data replacement in a MP cache according to the invention.

FIG. 3 is a flowchart depicting an embodiment of a method 100 for data replacement in a MP cache according to the invention. The cache is searched (step 110) for a requested cache line. If it is determined (step 120) that the cache line is present in the MP cache (i.e., a cache "hit" is determined), the data are read (step 130) from the cache. If instead the cache line is not present (i.e., a cache "miss"), the data are read (step 140) from one or more decoder memory buffers or modules external to the cache circuitry. One or more counters in the cache circuitry are updated (step 150) to indicate whether a hit or miss occurred. If it is determined (step 160) that the number of frames decoded since a last performance evaluation is less than a predetermined value, the method returns to step 110 to search for the next requested cache line. However, if the number of decoded frames has reached the predetermined value, a determination is made (step 170) as to whether the cache performance as indicated by the counter values is acceptable. If yes, then the method 100 returns to step 110 to search for the next requested cache line. However, if the cache performance is determined not to be acceptable, the set definitions, replacement algorithm, or both the set definitions and replacement algorithm are changed (step 180) to attempt to improve the cache performance as described in more detail below.

Figures 4, 5, 6:
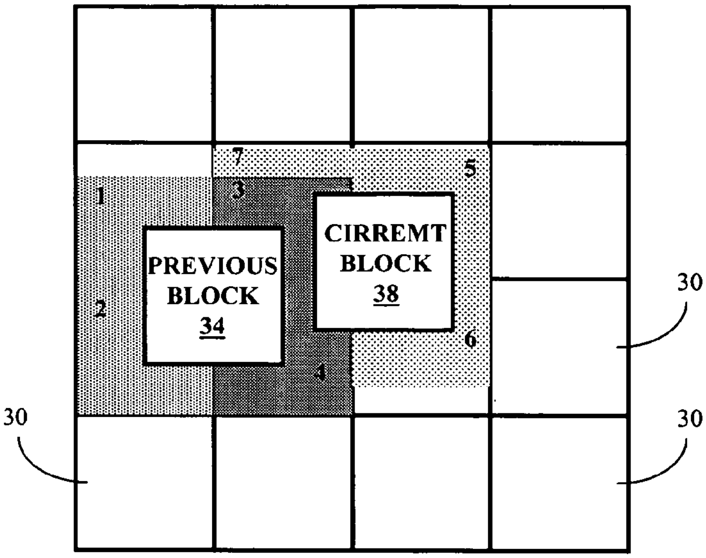
FIG. 4 illustrates a portion of an image frame for an example of how cache lines are replaced in a MP cache according to the invention.
FIG. 5 is an illustration of a tag entry format according to an embodiment of the invention.
FIG. 6 is an illustration of one tiling configuration in which each rectangle represents a tile in or near a tile associated with a currently requested tile address.

FIG. 4 depicts 16 macroblocks 30 from a portion of an image frame in an example of how cache lines are replaced in a MP cache. After processing a previous macroblock 34, regions 1, 2, 3 and 4 are available in a cache set. During processing of the current macroblock 38, requests are made for data in regions 5, 6, 7, 3 and 4. If the requested data are already in the cache set, the data are read from the cache. However, if there is a cache miss and if the set is fully populated, some of the cache lines will be evicted (i.e., replaced) to enable additional data to be written to the cache for the same set. For example, regions 3 and 4 can be evicted and requested at a later time as necessary. However, according to the invention, a tag distance is calculated for each cache line in the set corresponding to the request. The tag distance is determined by a spatial separation in an image frame between pixels for a currently requested cache line (i.e., "uncached" pixels) and pixels for a cache line stored in the cache. A local area in an image frame centered about the uncached pixels is defined. One or more cache lines associated with pixels outside the local area are identified for replacement. In another embodiment, the cache line having the maximum tag distance is replaced. In the present example, if the cache set is limited to four macroblocks of data, regions 1 and 2 are replaced as they are the most distant from the current macroblock 38 and regions 3 and 4 remain available in the cache.

If two or more cache lines qualify for replacement, a secondary identification process can be employed to determine which cache line to evict. The secondary process can include application of a least recently used (LRU) algorithm to the cache lines for data outside the local area or for cache lines that share a maximum tag distance. Alternatively, the secondary selection for identification of a cache line for replacement can be based on a round-robin selection process or a random technique.

Each data set in the cache has an associated tag memory in a different portion of the cache. Each tag memory includes descriptive information on the data stored in the respective data set. In one embodiment each tag entry 42 in a tag memory includes an address tag ADDR, a valid data flag V, a pending data flag P, a requested data flag R, a time flag TIME and a tag distance DIST as is shown in FIG. 5. The valid data flag V is used to indicate that the associated cache line can be evicted. Normally the valid data flag V is cleared at the start of a new image frame in the decoding process. An asserted pending data flag P designates that data have already been requested but have not yet been received from memory external to the cache circuit. Thus an asserted pending data flag P indicates that the associated cache line cannot be evicted. A requested data flag R indicates that data have been requested from the associated cache line but have not yet been read and therefore the cache line cannot be evicted. The time flag TIME indicates the last time the cache line was accessed and can be utilized, for example, by an LRU algorithm or the like as a secondary identification process for determining which cache line is to be evicted. The tag distance DIST indicates the distance of the cache line from the currently requested cache line. In one embodiment, the tag distance DIST includes three bits. Values of 1, 2 and 3 are assigned using the three bits for data from an adjacent horizontal macroblock, an adjacent vertical macroblock and an adjacent diagonal macroblock, respectively. A value of 4 is assigned for data not in adjacent macroblocks. In this embodiment, cache lines associated with a tag distance value of 4 are candidates for replacement.

In other embodiments tag entries include at least a portion of the attributes shown in the tag entry format 42 of FIG. 5 and can include one or more other attributes such as macroblock number and reference frame number.

The invention contemplates the determination of a tag distance according to a variety of techniques. The central concept to each determination is to replace cache lines that include data for pixels that are far from the currently requested pixel data and to protect (i.e., prevent replacement of) cache lines that are in the same local image area. Information related to the location of the cache line within an image is stored in tag memory and compared to corresponding data for a current line to be stored in the cache. Alternatively, the location information is not stored for each cache line but is determined from the memory address of the cache line each time the tag memory is searched.

In one embodiment, the tag distance determination is based on macroblock number. The macroblock number describes the position of the corresponding macroblock in the image frame. A macroblock number is stored for each cache line in tag memory and compared to the macroblock number of each request to determine whether a cache line is in the local image area. Generally, local cache lines are maintained in the cache while cache lines outside the local area are subject to replacement with the data corresponding to the current request. The local area can be programmable and can be adaptively changed according to the cache performance.

In one example, the local area is generally described as one macroblock centered on the currently requested macroblock. In another example, the local area is described as a set of nine macroblocks centered on the requested macroblock. More generally, the local area can be described as a set of cache lines surrounding and including the currently requested cache line.

For high definition (HD) image format, each image includes a 120×68 configuration of macroblocks, or a total of 8,160 macroblocks. Consequently, an additional 13 bits of storage are required to implement the macroblock technique.

Table 1 provides an example of how macroblock numbers can be used to determine the position in an image frame of a current macroblock waiting to be written to the cache relative to a valid macroblock in the cache. In this example the relative positions shown are those corresponding to the requested macroblock position and the eight surrounding macroblock positions.

TABLE 1

| COMPARISON EQUATION | RESULT | RELATIVE POSITION |
|---|---|---|
| MB_REG − REQ_MB | 0 | Collocated macroblock |
| | 1 | Horizontally adjacent on the left |
| | −1 | Horizontally adjacent on the right |
| MB_REG − REQ_MB + PITCH | 0 | Vertically adjacent below |
| | 1 | Diagonally adjacent right-below |
| | −1 | Diagonally adjacent left-below |
| REQ_MB − MB_REG + PITCH | 0 | Vertically adjacent above |
| | 1 | Diagonally adjacent right-above |
| | −1 | Diagonally adjacent left-above |

REQ_MB represents the macroblock number portion of a new tag associated with a requested macroblock, MB_REG represents the macroblock number portion of a valid tag in tag memory and PITCH represents the width of an image frame expressed in macroblocks. Three RESULT values and the corresponding relative positions are shown for each comparison equation. For a nine macroblock local area, the absolute value of the RESULT value is at least two for each valid tag associated with a macroblock outside the local area. The result value can be used to calculate a tag distance (or may be used directly as the tag distance) for determination of which macroblock or cache line to replace.

In another embodiment, the determination of a tag distance is based on the memory address of a cache line. FIG. 6 illustrates a tiling configuration in which each rectangle represents a tile associated with a cache line. Although only 27 tiles are illustrated, cache lines can be from any location within an image frame. Each cache line represented in the figure is tested for its presence in the cache tag memory using the currently requested tile address C, the pitch P and the addresses of the cache lines stored in the tag memory.

Figure 7:
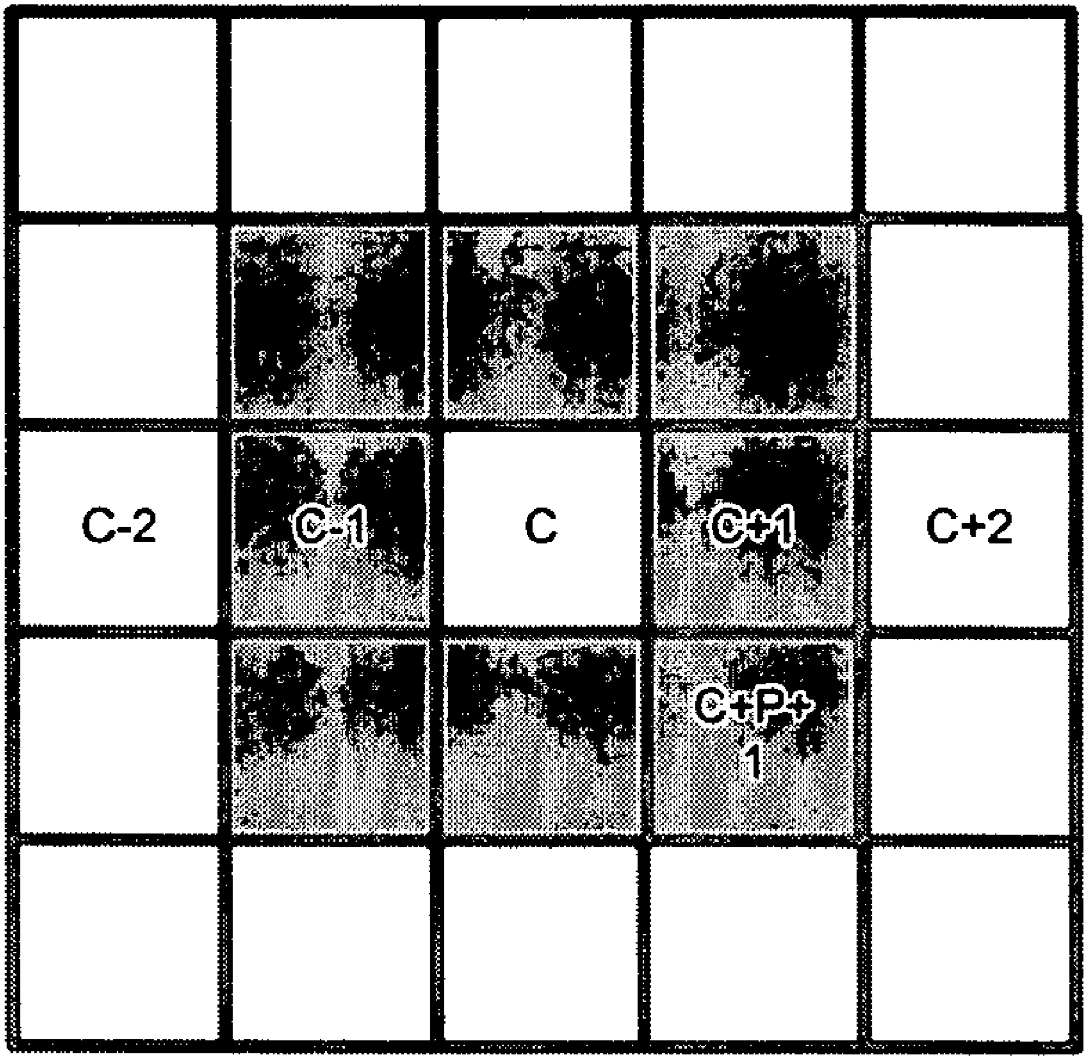
FIG. 7 is an illustration of another tiling configuration in which each box represents a tile in or near a tile associated with a currently requested tile address.

FIG. 7 illustrates another tiling configuration in which each box represents a tile associated ache line. Again, each cache line represented in the figure can be tested for its presence in the cache tag memory using the currently requested tile address C, the pitch P and the address of the cache lines stored in the tag memory.

In general, the tag distance for a cache line increases as the image distance between the tile associated with the cache line and the tile C having the currently requested tile address increases. Table 2 lists a three bit value of a tag distance size TD_SIZE associated with each tile displayed in FIG. 6 and in FIG. 7. The local area is defined according to a predefined value for the tag distance size. In general, a cache line is considered to be in a local area if the associated tile is one of the tiles defined by the tag distance size. For example, if the tag distance size is 1, the local area is defined by the C tile and the shaded tiles in FIG. 6 and in FIG. 7 Preferably, the value of the tag distance size is dynamically and adaptively changed according to cache performance. Except for one additional bit, no extra storage is required as the address is already stored in the tag memory. The additional bit indicates whether the address corresponds to a macreblock at the right or left edge of the reference frame.

TABLE 2

| TD_SIZE | LOCAL AREA FOR TILING CONFIGURATION OF FIG. 6 | LOCAL AREA FOR TILING CONFIGURATION OF FIG. 7 |
|---|---|---|
| 0 | Co-located tile (tile C) | Co-located tile (tile C) |
| 1 | 9 tiles (shaded tiles plus C tile) | 9 tiles (shaded tiles plus C tile) |
| 2 | 15 tiles | 25 tiles (5 × 5 tiles) |
| 3 | 21 tiles (3 × 7 tiles) | |
| 4 | 27 tiles (3 × 7 tiles) | |

Referring to FIG. 6, in an alternative embodiment, a three bit value is used for each of a horizontal tag distance size TD_SIZE_H and a vertical tag distance size TD_SIZE_V. Table 3 lists a limited number of pairs of values for the horizontal and vertical tag distance sizes that can be used to define different local areas. A cache line is considered to be in a local area if the associated tile is one of the tiles defined by the horizontal and vertical tag distance sizes. Cache lines determined to be outside the local area are subject to replacement. For example, if the local area is defined as an arrangement of 5 tiles high by 3 tiles wide, a cache line for a tile (C−P+2 (not visible in figure)) that is two tiles to the right and one tile high relative to the currently requested tile (C) is determined to be outside the local area and may be replaced by data for the currently requested cache line. In contrast, a cache line for a tile (C−2P+1) that is one tile to the right and two tiles high relative to the currently requested tile is determined to be in the local area and is not be subject to replacement.

TABLE 3

| TD_SIZE_H | TD_SIZE_V | LOCAL AREA |
|---|---|---|
| 0 | 0 | One co-located tile |
| 1 | 1 | 9 tiles around the requested one |
| 1 | 2 | 15 tiles in arrangement of 5 high and 3 wide tiles |
| 2 | 1 | 15 tiles in arrangement of 3 high and 5 wide tiles |

Figure 8:
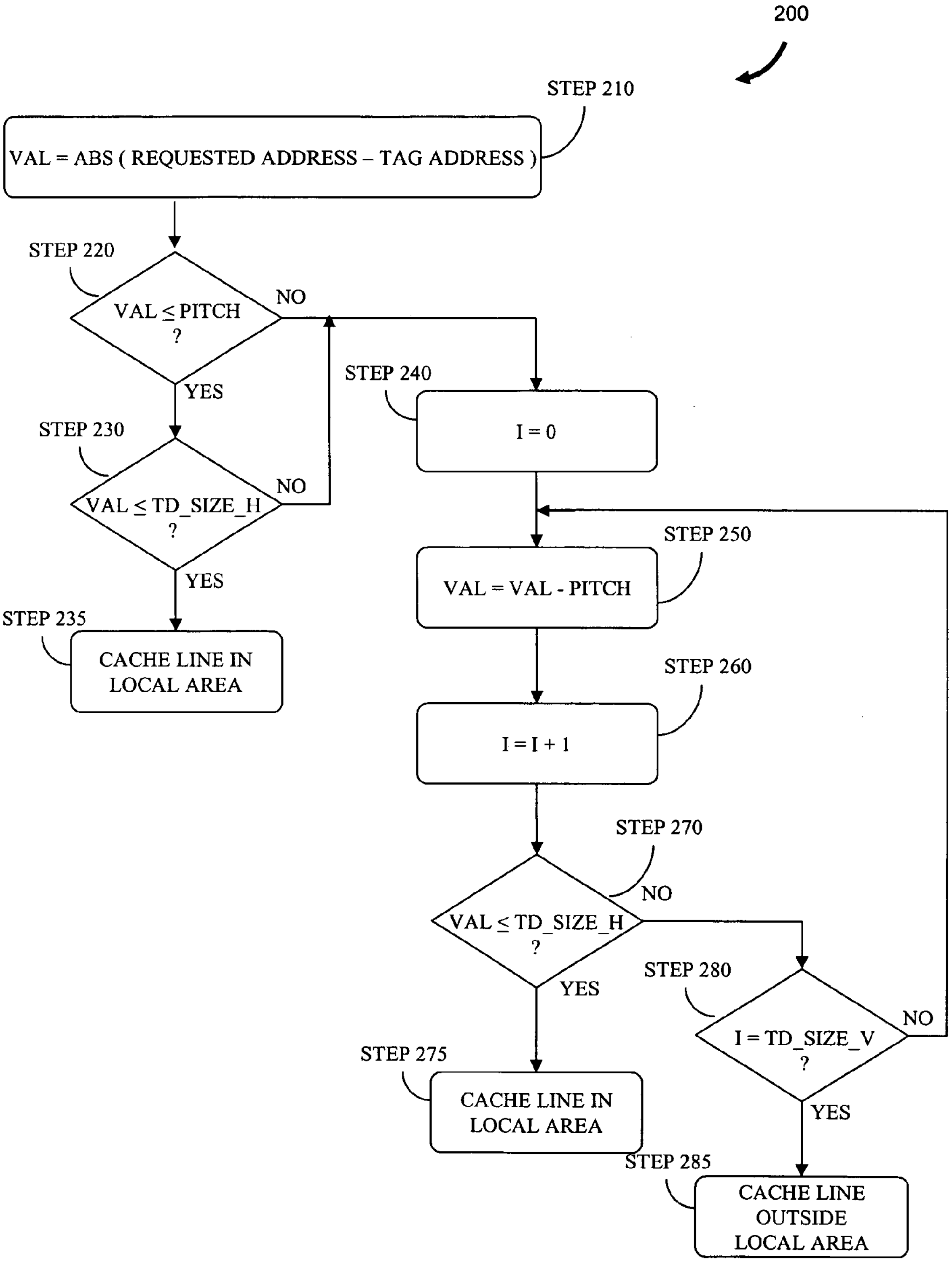
FIG. 8 is a flowchart representation of an embodiment of a method for determining whether a cache line is a candidate for replacement in an MP cache in accordance with the invention.

FIG. 8 is a flowchart depicting an embodiment of a method 200 for determining whether a cache line is a candidate for replacement in an MP cache. More particularly, the method 200 is used to determine whether a cache line is within a local area defined about a currently requested cache line. The method 200 utilizes a predetermined value for the horizontal tag distance size TD_SIZE_H and the vertical tag distance size TD_SIZE_V according to a desired local area. For each cache line currently in the cache, a value VAL equal to the absolute value of the difference of the address for the requested cache line and the tag address of the cache line is determined (step 210) and compared (step 220) to the pitch value PITCH. If the value does not exceed the pitch, the value is compared (step 230) to the horizontal tag distance size. If the value does not exceed the horizontal tag distance size, the cache line is deemed (step 235) to be in the local area. However, if the value exceeds the pitch or if the value exceeds the horizontal tag distance size, the method 200 proceeds to step 240 to initialize a loop counter I, to decrease the value by the pitch value (step 250) and to increment the loop counter (step 260). If the value is determined (step 270) not to exceed the horizontal tag distance size, the cache line is deemed (step 275) to be in the local area, otherwise the method 200 continues by comparing (step 280) the loop counter to the vertical tag distance size. If the value of the loop counter does not yet equal the vertical tag distance size, steps 250, 260 and 270 are repeated until the cache line is determined (step 275) to be in the local area or the loop counter increases to equal the vertical tag distance size so that the cache line is deemed (step 285) to be outside the local area.

In another embodiment, the tag distance for a cache line is based on the rectangular (i.e., x and y) image coordinates for the associated tile. Although each coordinate is based on 11 bits and significant additional storage is utilized, the comparisons of the coordinates associated with the currently requested cache line and the coordinates of each stored cache line can be performed in a similar manner to the macroblock number and address comparisons described above for other embodiments. A limited number of gates are used to determine whether the cache lines are in a local area or are available for replacement.

Figure 9:
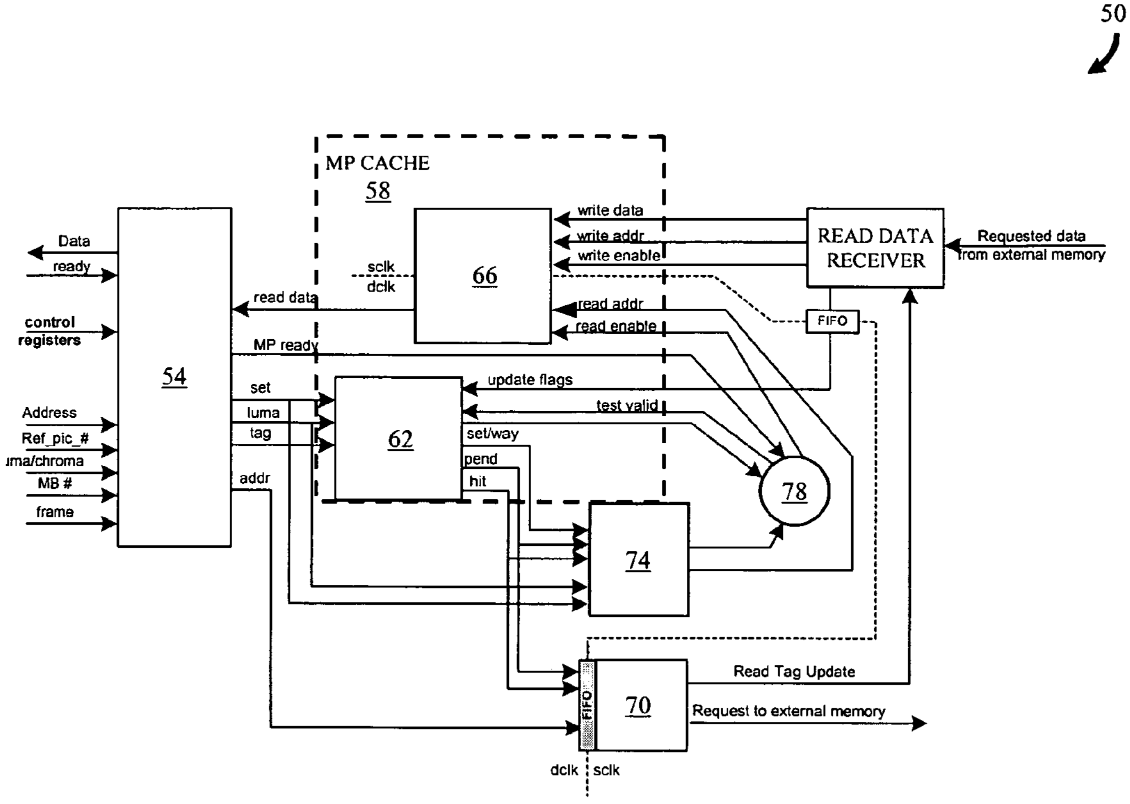
FIG. 9 illustrates an embodiment of a cache circuit for a motion prediction cache according to principles of the invention.

FIG. 9 illustrates an embodiment of a cache circuit 50 for a motion prediction cache according to principles of the invention. The circuit 50 includes a control module 54, a motion prediction cache 58 having a tag memory 62 and a data cache memory 66, an external data request module 70, a request queue 74 and a state machine 78.

In operation, a request from a motion prediction module is received at the control module 54. The request can contain a cache address, a reference frame number, a macroblock number and the like. The control module 54 examines the request using a programmed set definition and searches the set in the tag memory corresponding to the set associated with the request. If the search results in a cache miss, a signal line "pend" is asserted to indicate a pending request, a valid flag is cleared, and a request to external memory (i.e., a memory buffer or module external to the cache circuit) is made by the external data request module 70. If the cache 58 is full because requested data have not arrived yet and there are no cache lines available for replacement, the request from the motion prediction module is delayed until cache lines become available. The tag memory 62 is written with at least some of the parameters in the request. If the search results in a cache hit, a signal line "hit" is asserted and the request flag R for the cache line is asserted. For either a cache miss or a cache hit, various parameters of the search are written to the request queue 74 and, if the request queue 74 is not full, the next request from the motion prediction module is serviced.

As the requested data from the external memory arrives, the read tag is used to look up the parameters associated with the cache line. The data may arrive in a different order than requested. The data are written to the data cache memory 66 and a valid flag V is asserted for the replacement cache line.

The state machine 82 monitors the request queue 74 and analyzes the next request. If the request is associated with a hit, the state machine 82 causes the corresponding data to be read from the data cache memory 66 to the control module 54, the request flag R for the cache line is cleared if there is only a single request for the data and the data are read from the control module 54 by the motion prediction module when ready. If more than one request for the same data was pending, a request counter is decremented to indicate that one request has been satisfied but at least one additional request for the same data remains pending. If the request is associated with a cache miss, the state machine 82 monitors the valid flag V for the cache line until it is asserted at which time the data are read from the data cache memory 66 to the control module 54 and then to the motion prediction module when ready. For every set in the tag memory 62, a cache line is identified for replacement upon determination of a cache miss for the set. When asserted, the request flag R and pending flag P for a cache line prevent it from being replaced.

While the invention has been shown and described with reference to specific embodiments, it should be understood by those skilled in the art that various changes in form and detail may be made therein without departing from the spirit and scope of the invention.

What is claimed is:

1. A method for replacing image data in a motion prediction cache comprised of a plurality of cache lines, the method comprising:

for each of the cache lines:

calculating a tag distance between pixels stored in the cache line and uncached pixels that are to be stored in the motion prediction cache;

using the calculated tag distance to determine whether the pixels stored in the cache line are outside a local image area defined about the uncached pixels; and if the pixels in the cache line are determined to be outside the local image area, replacing the pixels with the uncached pixels.

2. The method of claim 1 wherein the tag distance is calculated from a predefined set of values each associated with an image location relative to the image location of the uncached pixels.

3. The method of claim 1 wherein the motion prediction cache comprises a plurality of sets of cache lines and wherein the method is performed for each of the cache lines in one of the sets.

4. The method of claim 3 wherein the one of the sets comprises cache lines having pixels from a common reference frame.

5. The method of claim 1 wherein at least two of the cache lines are determined to have pixels outside the local image area and further comprising performing a secondary identification process to determine which of the at least two cache lines is to be replaced.

6. The method of claim 5 wherein performing a secondary identification process comprises identifying the cache line to be replaced using one of a least recently used determination, a round robin determination and a random determination.

7. The method of claim 1 wherein the tag distance comprises a horizontal tag distance and a vertical tag distance.

8. The method of claim 1 further comprising monitoring a cache performance and redefining the local image area in response thereto.

9. The method of claim 3 further comprising monitoring cache performance and changing a definition of the sets in response thereto.

10. A method for replacing image data in a motion prediction cache comprised of a plurality of cache lines, the method comprising:

for each of the cache lines, calculating a tag distance between pixels stored in the cache line and uncached pixels that are to be stored in the motion prediction cache;

comparing the tag distances to each other to determine a maximum tag distance; and replacing the pixels in one of the cache lines having the maximum tag distance with the uncached pixels.

11. The method of claim 10 wherein the motion prediction cache comprises a plurality of sets of cache lines and wherein the method is performed for each of the cache lines in one of the sets.

12. The method of claim 11 wherein the one of the sets comprises cache lines having pixels from a common reference frame.

13. The method of claim 10 wherein at least two of the cache lines are determined to have the maximum tag distance and further comprising performing a secondary identification process to determine which of the at least two cache lines is to be replaced.

14. The method of claim 13 wherein performing a secondary identification process comprises identifying the cache line to be replaced using one of a least recently used determination, a round robin determination and a random determination.

15. The method of claim 10 further comprising monitoring a cache performance and redefining the local image area in response thereto.

16. The method of claim 11 further comprising monitoring a cache performance and changing a definition of the sets in response thereto.

17. A system for decoding a video bitstream comprising:

a motion prediction cache having a data memory for storing a plurality of cache lines and having a tag memory for storing a plurality of tag entries wherein each tag entry includes at least one attribute of a respective one of the cache lines, the tag memory being organized as a plurality of sets defined according to the at least one attribute;

a control module in communication with the motion prediction cache and adapted to receive a request for a cache line, the request indicating at least one attribute of the cache line, wherein the control module searches one of the sets according to the at least one attribute to determine whether a tag entry for the requested cache line is in the tag memory and determines a tag distance for each of the tag entries in the set if the tag entry is not in the tag memory; and a state machine in communication with the motion prediction cache and configured to identify one of the cache lines in the data memory for replacement by the requested cache line if the tag entry for the requested cache line is not in the tag memory.

18. The system of claim 17 further comprising an external data request module in communication with the motion prediction cache and configured to make a request to an external memory module upon a determination that the requested cache line does not have a tag entry in the set.

19. The system of claim 17 further comprising a request queue in communication with the motion prediction cache and the state machine.

* * * * *